J. W. CHAMPION.
Wheat-Steamer.

No. 220,122. Patented Sept. 30, 1879.

WITNESSES:
C. Neveux
C. Sedgwick

INVENTOR:
J. W. Champion
BY Munn & Co
ATTORNEYS.

UNITED STATES PATENT OFFICE.

JEREMIAH W. CHAMPION, OF ROCHEPORT, MISSOURI.

IMPROVEMENT IN WHEAT-STEAMERS.

Specification forming part of Letters Patent No. 220,122, dated September 30, 1879; application filed June 17, 1879.

*To all whom it may concern:*

Be it known that I, JEREMIAH W. CHAMPION, of Rocheport, in the county of Boone and State of Missouri, have invented a new and Improved Wheat-Steamer, of which the following is a specification.

The object of my invention is to furnish a simple and efficient apparatus for steaming dry or frozen wheat previous to grinding; and the invention consists in the combination, with a pipe or tube through which the grain is passed, of an outer pipe or shell forming a steam-space and screw-plugs, whereby more or less steam may be admitted in contact with the wheat.

Figure 1:
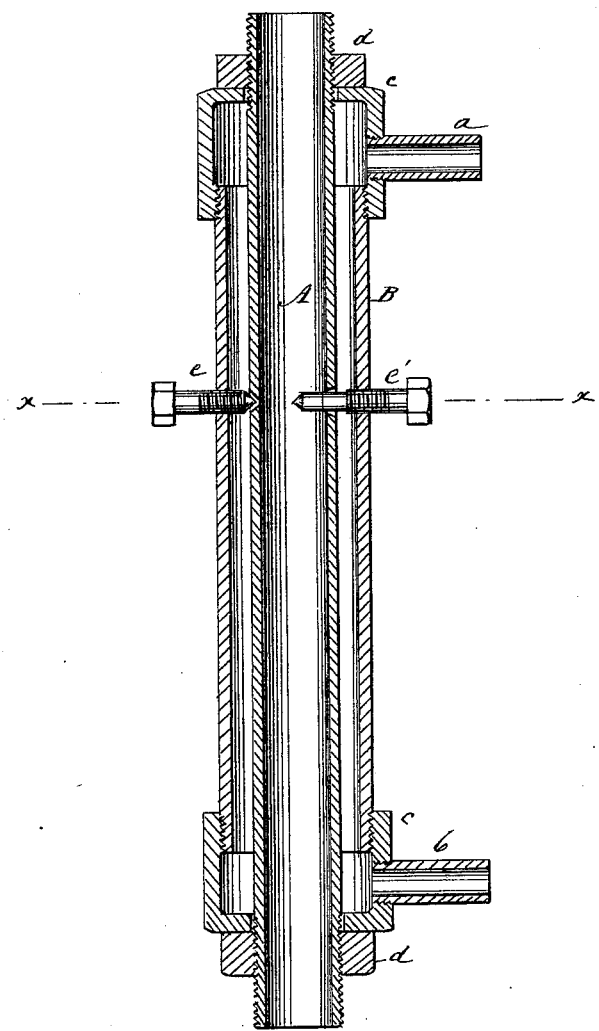
Figure 2:
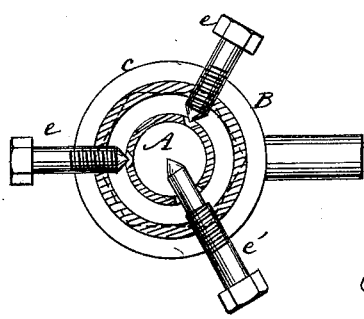

The apparatus is shown in the accompanying drawings, wherein Figure 1 is a longitudinal section. Fig. 2 is a cross-section on line $x\ x$ of Fig. 1.

Similar letters of reference indicate corresponding parts.

A is the feed pipe or tube, of suitable size and length, through which the wheat is to pass to the mill; and B is the outer tube or pipe, forming an annular steam-space around the tube A. $a$ is a small pipe connecting with tube B, for the inlet of steam; and $b$ is a pipe attached to the lower end of the pipe B, for the outlet of steam and water. Each end of the pipe B is closed around the pipe A by a screw-cap, $c$, and the tube B is retained in place by the nuts $d$, that are screwed on the pipe A tightly against the outside of the caps $c$. The pipe B is tapped to receive the screw-plugs $e$, which are fitted coincident with perforations in the pipe A, and have their inner ends tapering to enter the perforations and close them, so that by screwing the plugs $e$ in or out the perforations are opened more or less or closed entirely. I have shown three of these plugs arranged equidistant on the same horizontal line, but do not limit myself in that respect. One of the plugs, $e'$, is shown as passing through the tube A and extending to the center, which construction is preferable in large apparatus, as the steam may pass to the center as well as outside of the mass of grain.

In operation the wheat will be fed to the pipe A, and the delivery from that pipe will be regulated so that the wheat will pass slowly through.

The plugs $e$ will be regulated to admit more or less steam according to the condition of the wheat, and in some cases where the grain is neither frozen or very dry, the steam-heat applied within the outer tube, with the perforations closed, will be sufficient to draw the moisture in the grain from the center to the outside and render the husk soft.

With very dry grain the steam admitted by the perforations will soften the kernel, so that the husk will not break up into fine particles when the wheat is ground, while with frozen grain the combined heat and steam will soften it and render it for grinding.

Having thus described my invention, I claim as new and desire to secure by Letters Patent—

As an improved wheat-steamer, the apparatus, substantially as shown and described, consisting of the perforated feed-pipe A and outer pipe, B, having closed ends, inlet $a$, outlet $b$, and fitted with the screw-plugs $e$, substantially as specified.

JEREMIAH WILLIS CHAMPION.

Witnesses:
 C. L. MCFARLAND,
 SAML. P. SCOBEE.